(12) United States Patent
Su et al.

(10) Patent No.: US 9,039,024 B1
(45) Date of Patent: May 26, 2015

(54) BICYCLE SEATPOST

(71) Applicant: GIANT MANUFACTURING CO., LTD., Taichung (TW)

(72) Inventors: Hui-Yuan Su, Kaohsiung (TW); Owen Chang, Taichung (TW); Che-Wei Hsu, New Taipei (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 0 days.

(21) Appl. No.: 14/219,005

(22) Filed: Mar. 19, 2014

(51) Int. Cl.
*B62J 1/08* (2006.01)

(52) U.S. Cl.
CPC .......................................... *B62J 1/08* (2013.01)

(58) Field of Classification Search
CPC .................................... B62J 1/08; B62J 1/085
See application file for complete search history.

(56) References Cited

U.S. PATENT DOCUMENTS

| | | | |
|---|---|---|---|
| 4,421,357 A * | 12/1983 | Shimano | 297/215.14 |
| 7,125,030 B2 * | 10/2006 | D'Aluisio et al. | 280/283 |
| 7,172,180 B2 * | 2/2007 | Branca et al. | 267/132 |
| 2004/0007847 A1 * | 1/2004 | Sinyard et al. | 280/275 |
| 2009/0121451 A1 * | 5/2009 | Chiang | 280/288.4 |
| 2012/0032414 A1 * | 2/2012 | Kaiser | 280/283 |
| 2012/0133107 A1 * | 5/2012 | Chiang | 280/281.1 |
| 2014/0252745 A1 * | 9/2014 | Soucek | 280/281.1 |

OTHER PUBLICATIONS

The blog (Clifford Lee, Spotted: Adam Craig's Prototype Disc Brake-Equipped Giant TCX Advanced, http://www.cxmagazine.com/adam-craig-prototype-giant-tcx-advanced-sea-otter-2013) recorded the present invention was disclosed in a cycling festival named Sea Otter Classic 2013 which was held between Apr. 18, 2013 and Apr. 23, 2013.

* cited by examiner

*Primary Examiner* — Kevin Hurley
(74) *Attorney, Agent, or Firm* — CKC & Partners Co., Ltd.

(57) ABSTRACT

A bicycle seatpost includes a first part and a second part. A curvature radius of the first part is $r_1$, and an arc length of the first part is equal to or greater than $\pi r_1$ and smaller than $2\pi r_1$, the first part is set toward a head of a bicycle. The second part is connected to the first part, wherein a curvature radius of the second part is greater than the curvature radius of the first part, the second part is set toward an end of the bicycle.

10 Claims, 4 Drawing Sheets

BICYCLE SEATPOST

BACKGROUND

1. Technical Field

The present invention relates to a bicycle. More particularly, the present invention relates to a bicycle seatpost.

2. Description of Related Art

Recently, riding bicycle becomes popular, and the various types of bicycles for applying to different places and demands are provided. Specifically, "shock absorbability" is one characteristic which should be strengthened.

In general, the bicycle is equipped with shock absorbers for absorbing shock and enhancing the comfort during riding bicycle, wherein the shock absorbers usually be set on front fork or the seat cushion post. Further, the weight of the mountain bicycle is greater than road bicycle, so that the assembling of the shock absorber on the mountain bicycle would not be a heavy burden. However, for road bicycle, the shock absorbers would add the weight of the road bicycle obviously and slow down the speed during riding road bicycle. Therefore, it is important for solving the shock absorbability and the characteristic of light weight at the same time.

SUMMARY

According to one aspect of the present disclosure, a bicycle seatpost includes a first part and a second part. A curvature radius of the first part is $r_1$, and an arc length of the first part is equal to or greater than $\pi r_1$ and smaller than $2\pi r_1$, the first part is set toward a head of a bicycle. The second part is connected to the first part, wherein a curvature radius of the second part is greater than the curvature radius of the first part, the second part is set toward an end of the bicycle.

According to another aspect of the present disclosure, a bicycle seatpost includes a first tube wall and a second tube wall. The first tube wall is a semi-circle structure and a curvature radius of the first tube wall is $r_1$. The second tube wall includes a forced part. The forced part is connected to two ends of the first tube wall, wherein a curvature radius of the forced part is $r_2$, and $r_2 > r_1$. An axial line of the bicycle seatpost which is parallel to a travel direction of a bicycle is shorter than an axial line of the bicycle seatpost which is perpendicular to the travel direction of the bicycle.

DETAILED DESCRIPTION

Figure 1:
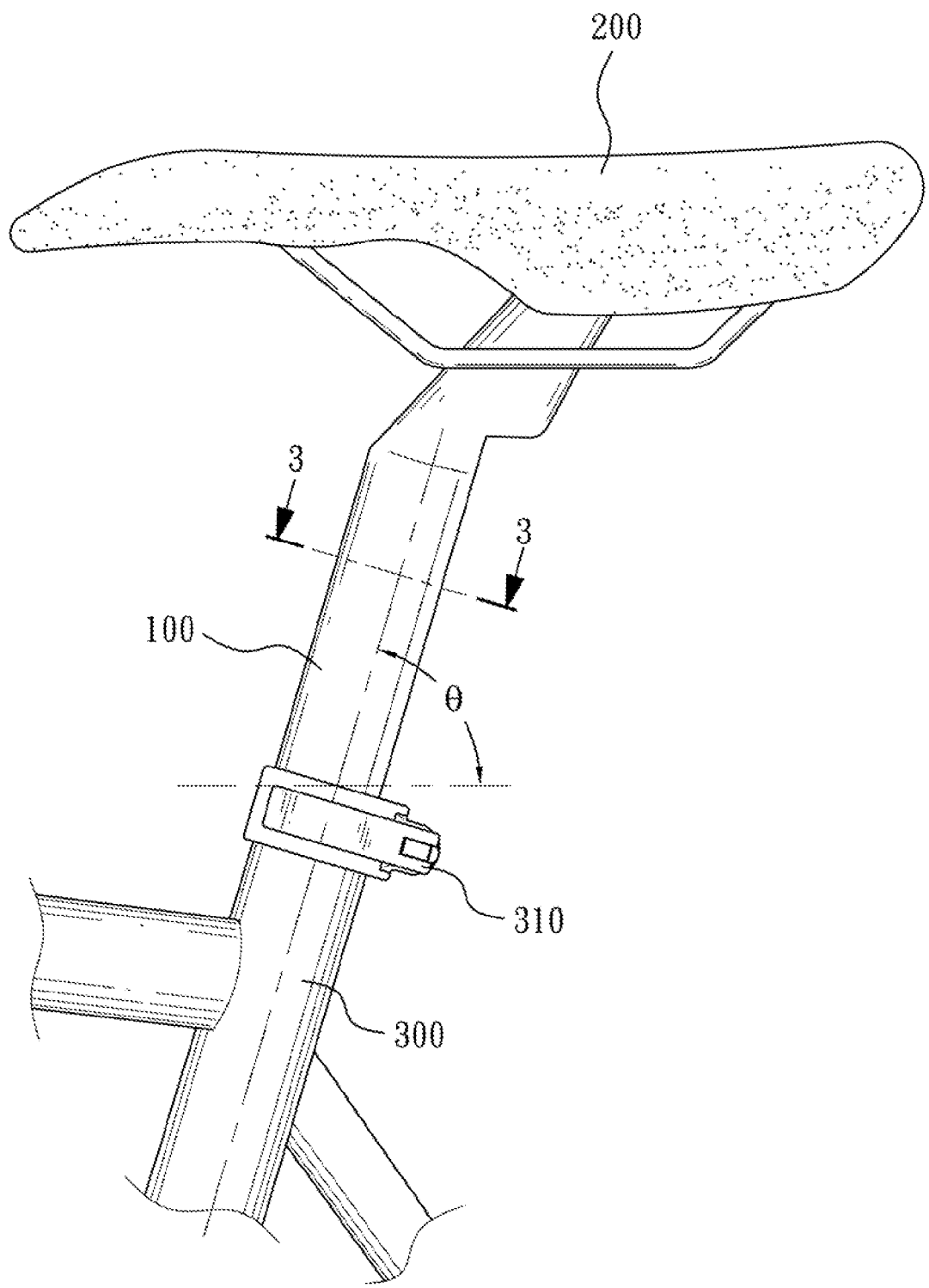
FIG. 1 shows a side view of a bicycle seatpost applied to a bicycle according to one embodiment of the present disclosure.

FIG. 1 shows a side view of a bicycle seatpost 100 applied to a bicycle according to one embodiment of the present disclosure. In FIG. 1, the bicycle seatpost 100 is for connecting a seat cushion 200 and a seat tube 300. In detail, one end of the bicycle seatpost 100 is connected to the seat cushion 200, and the other end of the bicycle seatpost 100 is movably located in the seat tube 300, wherein the height of the bicycle seatpost 100 can be positioned by a quick release 310 which is disposed on an outside of the seat tube 300.

Figure 2:
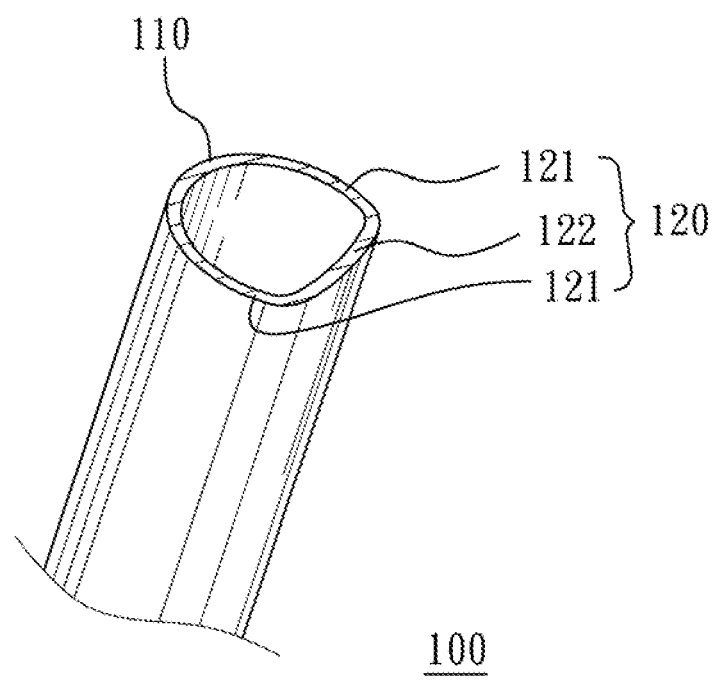
FIG. 2 shows a three dimensional view of the bicycle seatpost of FIG. 1.
Figure 3:
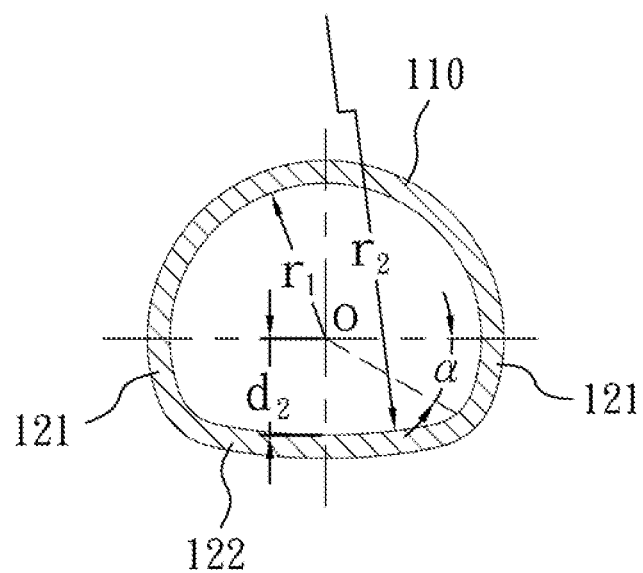
FIG. 3 shows across-sectional view along line 3-3 of FIG. 1.

FIG. 2 shows a three dimensional view of the bicycle seatpost 100 of FIG. 1. FIG. 3 shows a cross-sectional view along line 3-3 of FIG. 1. In FIGS. 2 and 3, the bicycle seatpost 100 includes a first tube wall 110 and a second tube wall 120, wherein the first tube wall 110 is connected to a second tube wall 120, so that the bicycle seatpost 100 is formed into a non-circular tube.

The first tube wall 110 can be a semi-circle structure, and a curvature radius of the first tube wall is $r_1$. The second tube wall 120 includes two arc parts 121 and a forced part 122. The arc parts 121 are connected to two ends of the first tube wall 110 respectively, wherein a curvature radius of each of the arc parts 121 is $r_1$. The forced part 122 is connected to the arc parts. According to the cross-sectional view of FIG. 3, a curvature radius of the forced part is $r_2$, and $r_2 > r_1$.

In the relationship of the first tube wall 110 and the forced part 122, a midpoint between the two ends of the first tube wall 110 is O. A distance from the first tube wall 110 to the midpoint O is $r_1$, that is, $r_1$ is the curvature radius of the first tube wall 110. A minimum distance between the forced part 122 and the midpoint O of the first tube wall 110 is $d_2$, wherein $d_2 < r_1$, that is, $d2 + r_1 < 2 r_1$. Therefore, the bicycle seatpost can be deformed easily for absorbing the shock, and the user would feel more comfortable during riding the bicycle.

The bicycle seatpost 100 of the present disclosure includes the first tube wall 110 and the second tube wall 120, which is formed into a non-circular tube, so that the perimeter of the bicycle seatpost 100 is shorter than a normal seatpost formed into circular tube. That is, when the thickness and the material of the tube wall of the bicycle seatpost 100 of the present disclosure and the normal seatpost are the same, the weight of the bicycle seatpost 100 of the present disclosure is less than the weight of the normal seatpost.

Further, an extending direction from one end to the other end of the first tube wall 110 is perpendicular to a travel direction of the bicycle, and an extending direction of the minimum distance between the forced part 122 and the midpoint O of the first tube wall 110 is paralleled to the travel direction of the bicycle. In FIG. 1, an angle θ between an extending direction of the bicycle seatpost 100 and a horizontal direction is greater than 0 degrees and less than 90 degrees.

In other words, the first tube wall 110 and the two arc parts 121 of the second tube wall 120 can be regarded as a first part of the bicycle seatpost 100, which is set toward a head of the bicycle. The first tube wall 110 is a semi-circle structure and the curvature radius of the first tube wall is $r_1$, so that the arc length of the first tube wall 110 is $\pi r_1$. The arc length of each of the arc parts is $\alpha r_1$, wherein the radian of the arc part 121 is $\alpha$, and $0 < \alpha < \pi/2$. Therefore, the arc length of the first part is $\pi r_1 + 2\alpha r_1$, wherein the arc length of the first part is greater that $\pi r_1$ and less than $2\alpha r_1$. The forced part 122 of the second tube wall 120 can be regarded as a second part of the bicycle seatpost 100, which is set toward an end of the bicycle. The curvature radius of the second part is $r_2$ and is greater than the curvature radius $r_1$ of the first part.

Figure 4:
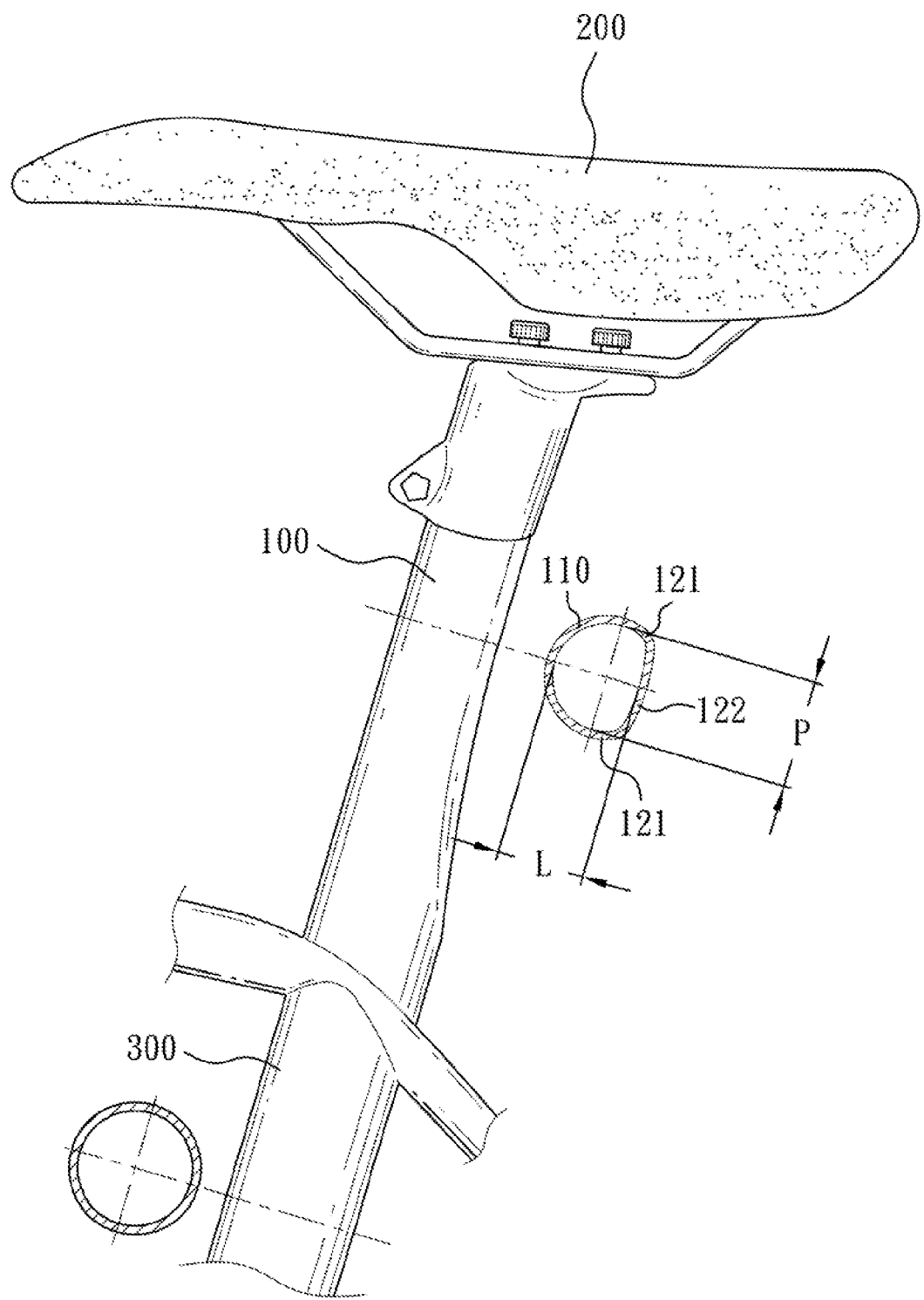
FIG. 4 shows a side view of a bicycle seatpost applied to a bicycle according to another embodiment of the present disclosure.

FIG. 4 shows a side view of a bicycle seatpost 100 applied to a bicycle according to another embodiment of the present disclosure. In FIG. 4, the bicycle seatpost 100 includes a first tube wall 110 and a second tube wall 120, wherein the first tube wall 110 is a semi-circle structure, and the second tube wall 120 includes two arc parts 121 and a forced part 122. The curvature radius of each of the arc parts 121 is equal to the curvature radius of the first tube wall 110. The arc parts 121 are connected to the two ends of the first tube all 110, and the forced part 122 is connected to the arc parts 121, wherein the curvature radius of the forced part 122 is greater than the arc part 121. In FIG. 4, one end of the bicycle seatpost 100 is connected to the seat cushion 200, and the other end of the bicycle seatpost 100 is integrally connected to the seat tube 300. Therefore, the bicycle seatpost 100 has the characteristics of light weight and the shock absorbability, and the component of the bicycle can be simplify due to the integrally connection between the seat tube 300 and the bicycle seatpost 100.

In FIG. 4, the axial line L of the bicycle seatpost 100 which is parallel to the travel direction of the bicycle is shorter than the axial line P of the bicycle seatpost 100 which is perpendicular to the travel direction of the bicycle. With the angle θ of the bicycle seatpost 100 (between the extending direction of the bicycle seatpost 100 and a horizontal direction), when the user rides the bicycle, the forced part 122 of the second tube wall 120 would be pressed and deformed for providing the shock absorbability.

Figure 5:
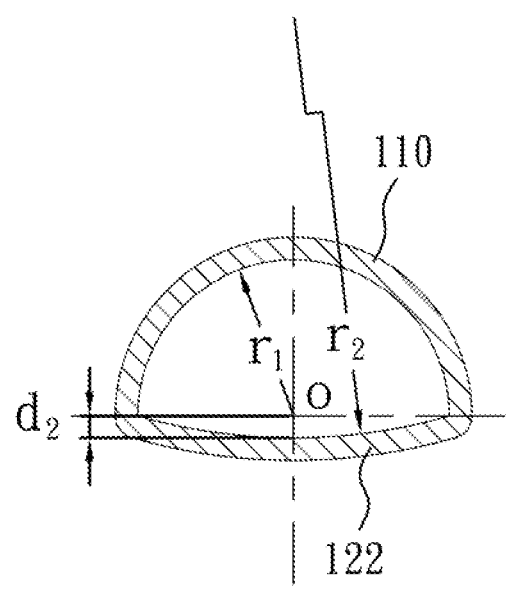
FIG. 5 shows a cross-sectional view of a bicycle seatpost applied to a bicycle according to another embodiment of the present disclosure.

FIG. 5 shows a cross-sectional view of a bicycle seatpost applied to a bicycle according to another embodiment of the present disclosure. In FIG. 5, the bicycle seatpost includes a first tube wall and a second tube wall, wherein the second tube wall includes a forced part 122 connected to two end of the first tube wall 110. A curvature radius of the first tube wall is $r_1$, a curvature radius of the forced part is $r_2$, and $r_2 > r_1$.

In this embodiment, when the minimum distance between the forced part 122 and a midpoint O between the two ends of the first tube wall 110 is d2, the curvature radius of the first tube wall 110 is $r_1$, and $d2 + r_1 < 2\,r_1$.

According to the foregoing statement, the shock absorber applied to the bicycle can be replaced by the bicycle seatpost 100 of the present disclosure. The bicycle seatpost 100 of the present disclosure provides the advantage as follow.

1. The characteristics of light weight of the bicycle seatpost 100 can be provided by the non-circular tube thereof.

2. The bicycle seatpost 100 can provide the shock absorbability with the structure and the angle between the bicycle seatpost 100 and the bicycle. That is, the shock can be absorbed and the user would feel more comfortable during riding the bicycle.

3. The quick release 310 can position the height of the bicycle seatpost 100 easily due to the arc length of the first part which greater than $\pi r_1$ and less than $2\pi r_1$.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A bicycle seatpost, comprising:
   a first part, wherein a curvature radius of the first part is $r_1$, and an arc length of the first part is equal to or greater than $\pi r_1$ and smaller than $2\pi r_1$, the first part is set toward a head of a bicycle; and
   a second part connected to the first part, wherein a curvature radius of the second part is greater than the curvature radius of the first part, the second part is set toward an end of the bicycle.

2. The bicycle seatpost of claim 1, wherein an angle between an extending direction of the bicycle seatpost and a horizontal direction is greater than 0 degrees and less than 90 degrees.

3. The bicycle seatpost of claim 1, wherein an axial line of the bicycle seatpost which is parallel to a travel direction of the bicycle is shorter than an axial line of the bicycle seatpost which is perpendicular to the travel direction of the bicycle.

4. A bicycle seatpost, comprising
   a first tube wall, wherein a curvature radius of the first tube wall is $r_1$; and
   a second tube wall, comprising
      a forced part connected to two ends of the first tube wall, wherein
   a curvature radius of the forced part is $r_2$, and $r_2 > r_1$;
   wherein an axial line of the bicycle seatpost which is parallel to a travel direction of a bicycle is shorter than an axial line of the bicycle seatpost which is perpendicular to the travel direction of the bicycle.

5. The bicycle seatpost of claim 4, wherein the first tube wall is a semi-circle structure.

6. The bicycle seatpost of claim 4, wherein the second tube wall comprises two arc parts, each arc part is connected each end of the first tube wall and the forced part, wherein a curvature radius of each of the arc parts is $r_1$.

7. The bicycle seatpost of claim 4, wherein an extending direction from one end to the other end of the first tube wall is perpendicular to a travel direction of a bicycle.

8. The bicycle seatpost of claim 4, wherein an extending direction of a minimum distance between the forced part and a midpoint of the first tube wall is paralleled to a travel direction of a bicycle.

9. The bicycle seatpost of claim 4, wherein an angle between a extending direction of the bicycle seatpost and a horizontal direction is greater than 0 degrees and less than 90 degrees.

10. The bicycle seatpost of claim 4, wherein a minimum distance between the forced part and a midpoint between the two ends of the first tube wall is d2, the curvature radius of the first tube wall is $r_1$, and $d2 + r_1 < 2\,r_1$.

* * * * *